United States Patent [19]

Ulrich et al.

[11] Patent Number: 4,602,423
[45] Date of Patent: Jul. 29, 1986

[54] METHOD OF MAKING A STATOR FOR AN ELECTRIC MULTIPHASE MOTOR

[75] Inventors: Bodo Ulrich, Lengfeld; Helmut Schmidt, Reichenberg; Peter Adam, Höchberg; Ottomar Dlouhy, Rottendorf; Helmut Gold; Hans Lamatsch, both of Nuremberg; Dieter Vanek; Kurt Trautner, both of Nuremberg, all of Fed. Rep. of Germany

[73] Assignee: Siemens Aktiengesellschaft, Berlin and Munich, Fed. Rep. of Germany

[21] Appl. No.: 94,498

[22] Filed: Nov. 15, 1979

Related U.S. Application Data

[62] Division of Ser. No. 835,784, Sep. 22, 1977, abandoned.

[30] Foreign Application Priority Data

Sep. 30, 1976 [DE] Fed. Rep. of Germany ....... 2644279

[51] Int. Cl.[4] .............................................. H02K 15/00
[52] U.S. Cl. .................................. 29/596; 310/40 R; 310/42; 310/43; 310/218; 310/258
[58] Field of Search ............... 310/42, 43, 40 R, 49 R, 310/218, 256, 258–260; 29/596

[56] References Cited

U.S. PATENT DOCUMENTS

| 2,607,816 | 8/1952 | Ryder et al. | 29/596 |
| 2,804,680 | 9/1957 | Flagg, Jr. | 29/596 |
| 2,944,297 | 7/1960 | Maynard | 29/596 |
| 3,742,595 | 7/1973 | Lykes | 29/596 |
| 3,914,859 | 10/1975 | Pierson | 29/596 |

Primary Examiner—Mark O. Budd
Attorney, Agent, or Firm—Kenyon & Kenyon

[57] ABSTRACT

An electric multiphase motor with a closed ring housing and a pole piece star which is inserted therein after being wound from the outside, the pole piece star having axially integral pole pieces which are arranged in star-like fashion around a hollow cylinder and inserted therein in which great strength of the pole star is achieved while at the same time ensuring good electrical data by inserting the radially inner ends of the pole pieces into the hollow cylinder as individual parts up to the bore of the hollow cylinder so that after the assembly of the motor no further finishing operations are required and welding the radially outer ends of the pole pieces to the inside to the surrounding ring housing by electron beam welding starting at the outer circumference of the ring housing.

12 Claims, 7 Drawing Figures

METHOD OF MAKING A STATOR FOR AN ELECTRIC MULTIPHASE MOTOR

This is a division of application Ser. No. 835,784 filed Sept. 22, 1977, now abandoned.

BACKGROUND OF THE INVENTION

The invention relates to a stator for an electric multiphase motor, particularly a stepping motor with a ring housing and pole pieces arranged in star-like fashion which can be inserted therein and can be wound from the outside, having axially integral pole pieces which are arranged in star-like fashion around a hollow cylinder and are inserted into the latter, in general and more particularly to an improved stator of this nature.

In one known stator of this type (German Offenlegungsschrift No. 1 814 977) the pole pieces sit with their one end in a hollow cylinder of plastic; for this purpose, they extend into the hollow cylinder up to a certain radial depth, so that either a circular intermediate layer of plastic remains between the radially inner limit of the pole pieces forming the legs of the star and the air gap proper, or the hollow cylinder must be turned from the inside in a further operation in order to obtain a particularly small air gap between the legs and the rotor. The fabrication and the joining of the hollow cylinder to the legs is accomplished in a single operation by a compound sraying process. The pole pieces of the star consist of solid material and have bevelled end faces, so that each pole piece is trapezoidal. The end faces of the pole pieces may be straight lined or curved at an angle. A coating of plastic may also be applied to the end faces of the pole pieces. The pole piece star fabricated in this manner is pushed into a ring housing and is fastened and solidified with the former and in itself by casting with the casting resin.

In a further stator described in U.S. Pat. No. 2,607,816, the pole piece star is laminated in such a manner that a multiplicity of pole piece laminations are stacked congruently and secured to each other, for instance, by screws. Each individual pole piece star lamination is integrally stamped from sheet metal in such a manner that the teeth extending in the radial direction are formed onto an inner laminated hollow cylinder; the laminated hollow cylinder connects the teeth at the radially inner end and, thus forms magnetic bridges between them. The pole piece star, which is stacked from the individual laminations and is fastened together by axially extending screws is inserted into a closed ring housing, or partial ring housing segments are inserted between the radially outer ends, and are welded to the radially outer ends of the pole piece teeth for solidification.

SUMMARY OF THE INVENTION

It is an object of the present invention to obtain, for a stator of the type mentioned at the outset, in a simple manner, increased strength of the pole piece star in itself and in the surrounding ring housing with little electrical leakage and low magnetic resistance. According to the present invention, the solution of this problem is possible by inserting the pole pieces as individual parts into the hollow cylinder with their radially inner ends up to the bore diameter, which cylinder, after the motor is assembled, is not subjected to any further finishing operation, and by welding the radially outer ends of the pole pieces to the surrounding closed ring housing by means of electron beam welding on the inside starting at the outer circumference of the latter. The hollow cylinder consists advantageously of a die casting in the case of aluminum or an injection molding in the case of plastic in the manufacture of which the pole pieces of the pole piece star are cast in at the same time. As used herein, cast or casting refer to both die casting of metal and injection molding of plastic. If one wants to dispense with a separate fixture or die for such a die casting operation, then the hollow cylinder is provided in the form of a prefabricated part, which is provided with axial slots, into which the pole pieces are later inserted. If the pole pieces are cast in at the same time and also if the pole pieces are inserted later, the hollow cylinder is advantageously made of a non-ferromagnetic material, prefereably of aluminum or plastic so that no magnetic bridges are formed between the radially inner ends of the individual pole pieces of a pole piece star.

By designing a stator of an electric multiphase motor and in particular, of a stepping motor, in accordance with the present invention, in spite of the pole pieces being immersed in the hollow cylinder up to the air gap, great strength of the overall stator is still obtained which ensures a mechanically strong and electrically and magnetically low resistance transition between the flux carrying parts of the pole piece star and the surrounding return yoke ring housing, even with rough use or possible shrinkage of the plastic hollow cylinder.

The strength can be increased further advantageously by providing axial projections at the radial inner end faces of the pole pieces which are cast in for the purpose of additional anchoring into the accordingly extended hollow cylinder. For further strengthened anchoring between the hollow cylinder and the cast in pole pieces it is advantageous to provide the pole pieces with breakthroughs and/or profiles in the region of the hollow cylinder which are filled in with the injection material of the hollow cylinder for the purpose of additional anchoring.

In a manner known per se, insulation of the end faces of the pole pieces by a plastic coating can be provided, which optionally also extends over the edges of the end faces and is optionally injection molded as an integral part simultaneously with the hollow cylinder. If a separate insulation between the pole pieces and the winding to be applied is desired, then it is advantageous to provide a plastic coating on all the pole piece surfaces facing the winding. This can also be accomplished simultaneously with the casting of the pole pieces into the hollow cylinder. In order to avoid additional insulation between the would pole piece star and the surrounding ring housing, or damage to the assembled stator winding when the wound pole piece star is inserted into the surrounding ring housing, provision is made, according to a particular embodiment of the present invention, to place, at the end face on the coil heads of the winding mounted on the pole piece star, cup-like plastic caps with comb-like axial extensions which protrude into the slot space of the winding, and cover up the winding toward the ring housing, i.e., to provide a cover slide. Special insulation of the pole piece stars from the stator winding is important if, in one embodiment of the invention, the stator winding consists of a winding which is placed on the pole piece star using the needle winding technique. The special insulation of the slot space of the end faces of the pole piece star is not additionally required, however, if, in accordance with a further embodiment of the invention, the stator winding consists, of prefabricated insulated coils inserted onto the pole piece star, i.e., insertion using the winding insertion technique.

DETAILED DESCRIPTION OF THE INVENTION

In its basic design, the stator for a stepping motor consists of a pole piece star which is formed by individual pole pieces 3 and a hollow cylinder 1 and is inserted into a ring housing 2. In the slot spaces formed between the side walls of the pole pieces 3 as well as by the ring housing 2 and the hollow cylinder 1, a winding 4 is placed. This may be a prefabricated winding in the form of prefabricated coils using the winding insertion technique, or the winding 4 may be wound onto the pole piece star by machine using the needle winding technique.

Figure 1:
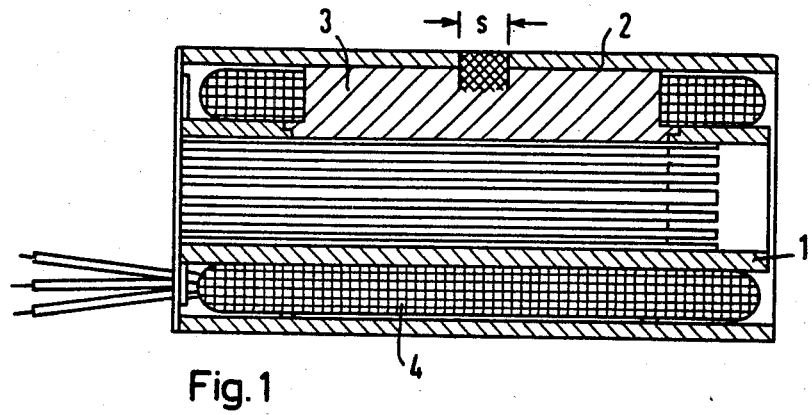
FIG. 1 is an axial cross-section view of the stator according to the present invention.

For the sake of clarity, the assembled winding 4 is shown only in FIG. 1; for the same reason, the attachment, holding and centering of the end bells are not dealt with in detail either in FIG. 1.

The pole pieces 3, which are simultaneously cast into the hollow cylinder 1, have axial projections 31 and 32 at the end faces of their radially inner ends which are anchored in the hollow cylinder 1, for the purpose of additionally securing them in the radial direction. The cylinder 1 is axially extended beyond the coil head. Breakthroughs 36 shown in FIG. 3 can also serve advantageously for additional mechanical securing during the injection.

Figure 2:
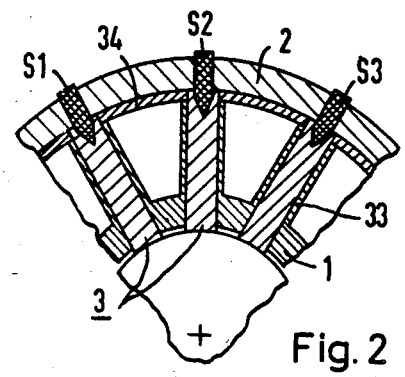
FIG. 2 is a partial radial cross-sectional view of the stator according to the present invention in the vicinity of the welds.

Approximately at its axial center, the ring housing 2 is welded to the pole pieces 3 in a short axial zone (zone S) by means of electron beam welding starting from its outer circumference. The "welded seams" are indicated in FIG. 2 by the reference symbols S1, S2 and S3. In this manner, a mechanically firm attachment and a low resistance magnetic flux transition between the pole pieces 3 and the ring housing 2, serving as the magnetic return, are obtained even if the plastic hollow cylinder 1 should shrink.

As can be seen in FIG. 2, the lateral surfaces of the pole pieces facing the winding are provided with insulating wall parts 33, which may be sprayed on simultaneously with the manufacture of the hollow cylinder 1, like the insulating end face coatings known per se, or they can be inserted as individual insulation parts, like separate insulating end plates. In addition, cover slides 34 may be provided.

Figure 3:
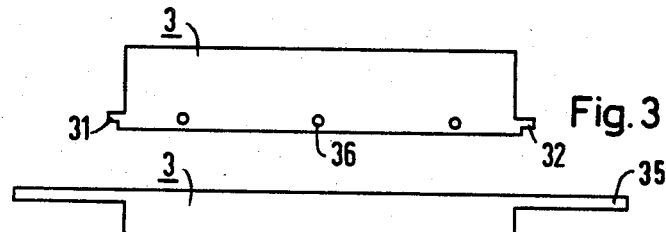
FIGS. 3, 4 and 5 illustrate different pole piece lamination outlines.
Figure 4:
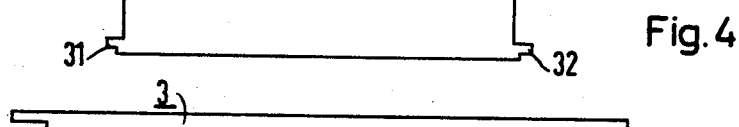
Figure 5:
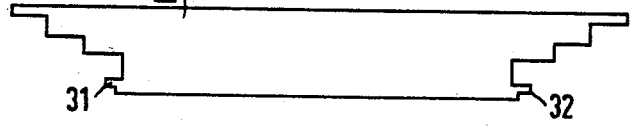
Figure 7:
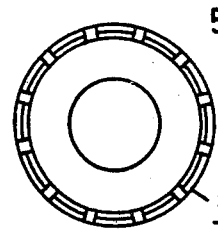
FIG. 7 is a radial cross-sectional view of the coil head insulation cap of FIG. 6.
Figure 6:
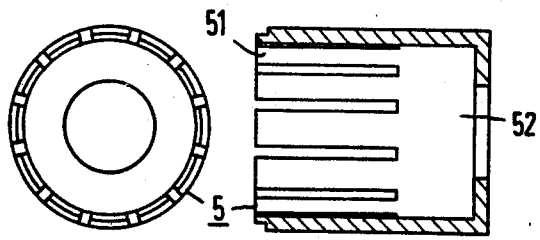
FIG. 6 is an axial cross-sectional view of a coil head insulation cap.

FIG. 3 shows a pole piece lamination outline with a contour which is rectangular in the exposed region (winding space). Such a shape is advantageous particularly if the stator winding is made by the winding insertion technique, where prefabricated coils are placed in the pole piece star from the outside. FIG. 4 shows a pole piece lamination outline, in which the pole pieces are additionally provided with projecting posts 35 which extend in the axial direction at their radially outer end, whereby a particularly good slot filling factor can be obtained if the stator winding is applied by means of the needle winding technique. A special embodiment of the pole piece lamination outline of FIG. 4 is shown in FIG. 5, where the end faces of the pole pieces are designed in steps with a cross section increasing toward the ring housing. FIGS. 6 and 7 show, in different views, cup-like plastic caps 5 which are pushed over the coil ends of the winding 4 at the end faces and inserted into the pole piece star. They center themselves at the cylindrical part of the pole piece star and extend with axial, comb-like extensions 51 into the slot spaces of the winding, covering up at least the slot space near the ring housing. When the pole piece star with its winding is pushed into the surrounding ring housing, such insulating caps 5 protect the winding mechanically against damage, as they cover the coil ends arranged in the cup shaped space 52 on all sides, and the winding parts located in the slots are protected and secured toward the slot opening.

What is claimed is:

1. An improved method for constructing the stator for an electric multiphase motor, particularly a stepping motor, which includes a closed ring housing and pole piece star which is inserted therein after being wound from the outside, the pole piece star having axial integral pole pieces which are arranged in star-like fashion about a cast hollow cylinder and are inserted into the latter comprising:
    (a) inserting the pole pieces into the hollow cylinder as individual parts with their radial inner edges extending up to the bore diameter of the hollow cylinder thereby avoiding further finishing operations of the hollow cylinder after the motor is assembled by casting the pole pieces into the hollow cylinder at the same time it is cast;
    (b) providing said pole pieces with axial projections at the end face of their radially inner end;
    (c) constructing said hollow cylinder of a sufficient axial length to extend beyond said projections;
    (d) casting said projections into the hollow cylinder for the purpose of additional anchoring; and
    (e) electron beam welding the radial outer ends of the pole pieces to the inside of the surrounding ring housing starting from the outer circumference of the ring housing, at a location in said ring housing intermediate the two ends thereof, starting from the outer circumference of the ring housing, with the ring housing solid and intact, whereby a suitable weld of the pole pieces to the inside of the surrounding ring housing will result without any processing of the ring housing and the pole pieces other than the performance of the electron beam weld itself.

2. The method according to claim 1 wherein said hollow cylinder is a cast part and further including the step of casting the pole pieces into the hollow cylinder at the same time it is cast.

3. The method according to claim 1 and further including forming said hollow cylinder as a prefabricated part with axial slots and inserting said pole pieces into said axial slots.

4. The method according to claim 1 wherein said hollow cylinder consists of aluminum.

5. The method according to claim 1 wherein said hollow cylinder consists of plastic.

6. The method according to claim 1, and further including filling the space between the winding of the pole piece star after it is inserted in the ring housing, and the inside surface of the ring housing with casting resin.

7. The method according to claim 1, wherein said stator winding is provided by inserting prefabricated coils onto the pole piece star using the winding insertion technique.

8. The method according to claim 1, wherein said stator winding is wound onto the pole piece star using the needle winding technique.

9. An improved method for constructing the stator for an electric mulitphase motor, particularly a stepping motor, which includes a closed ring housing and pole piece star which is inserted therein after being wound from the outside, the pole piece star having axially integral pole pieces which are arranged in star-like fashion about a cast hollow cylinder and are inserted into the latter comprising:
(a) inserting the pole pieces into the hollow cylinder as individual parts with their radial inner edges extending up to the bore diameter of the hollow cylinder thereby avoiding further finishing operations of the hollow cylinder after the motor is assembled by casting the pole pieces into the hollow cylinder at the same time it is cast;
(b) forming breakthroughs in said pole pieces and filling said breakthroughs with the material of which said hollow cylinder is cast, during casting, for the purpose of additional anchoring; and
(c) electron beam welding the radial outer ends of the pole pieces to the inside of the surrounding ring housing starting from the outer circumference of the ring housing, at a location in said ring housing intermediate the two ends thereof, starting from the outer circumference of the ring housing, with the ring housing solid and intact, whereby a suitable weld of the pole pieces to the inside of the surrounding ring housing will result without any processing of the ring housing and the pole pieces other than the performance of the electron beam weld itself.

10. An improved method for constructing the stator for an electric multiphase motor, particularly a stepping motor, which includes a closed ring housing and pole piece star which is inserted therein after being wound from the outisde, the pole piece star having axially integral pole pieces which are arranged in star-like fashion about a cast hollow cylinder and are inserted into the latter comprising:
(a) inserting the pole pieces into the hollow cylinder as individual parts with their radial inner edges extending up to the bore diameter of the hollow cylinder thereby avoiding further finishing operations of the hollow cylinder after the motor is assembled;
(b) electron beam welding the radial outer ends of the pole pieces to the inside of the surrounding ring housing starting from the outer circumference of the ring housing, at a location in said ring housing intermediate the two ends thereof, starting from the outer circumference of the ring housing, with the ring housing solid and intact, whereby a suitable weld of the pole pieces to the inside of the surrounding ring housing will result without any processing of the ring housing and the pole pieces other than the performance of the electron beam weld itself; and
(c) placing cup-like plastic caps having axial comb-like extensions over the end face of the coil head of the winding after assembly onto the pole piece star such that the axial comb-like extensions project into the slot space of the windings and cover up the winding in a direction towards the ring housing.

11. An improved method for constructing the stator for an electric multiphase motor, particularly a stepping motor, which includes a closed ring housing and pole piece star which is inserted therein after being wound from the outside, the pole piece star having axially integral pole pieces which are arranged in star-like fashion about a cast hollow cylinder and are inserted into the latter comprising:
(a) inserting the pole pieces into the hollow cylinder as individual parts with their radial inner edges extending up to the bore diameter of the hollow cylinder thereby avoiding further finishing operations of the hollow cylinder after the motor is assembled;
(b) forming said pole pieces with posts extending the axial direction at their radially outer end; and
(c) electron beam welding the radial outer ends of the pole pieces to the inside of the surrounding ring housing starting from the outer circumference of the ring housing, at a location in said ring housing intermediate the two ends thereof, starting from the outer circumference of the ring housing, with the ring housing solid and intact, whereby a suitable weld of the pole pieces to the inside of the surrounding ring housing will result without any processing of the ring housing and the pole pieces other than the performance of the electron beam weld itself.

12. An improved method for constructing the stator for an electric multiphase motor, particularly a stepping motor, which includes a closed ring housing and pole pieces star which is inserted therein after being wound from the outside, the pole pieces star having axially integral pole pieces which are arranged in star-like fashion about the cast hollow cylinder and are inserted into the latter comprising:
(a) inserting the pole pieces into the hollow cylinder as individual parts with their radial inner edges extending up to the bore diameter of the hollow cylinder thereby avoiding further finishing operations of the hollow cylinder after the motor is assembled;
(b) forming the end faces of said pole pieces with a cross section which increases in steps toward the ring housing; and
(c) electron beam welding the radial outer ends of the pole pieces to the inside of the surrounding ring housing starting from the outer circumference of the ring housing, at a location in said ring housing intermediate the two ends thereof, starting from the outer circumference of the ring housing, with the ring housing solid and intact, whereby a suitable weld of the pole pieces to the inside of the surrounding ring housing will result without any processing of the ring housing and the pole pieces other than the performance of the electron beam weld itself.

* * * * *